Aug. 31, 1954     I. WOLAR     2,687,867
HANGER FOR STEM-TYPE LIGHTING FIXTURES
Filed Oct. 8, 1951
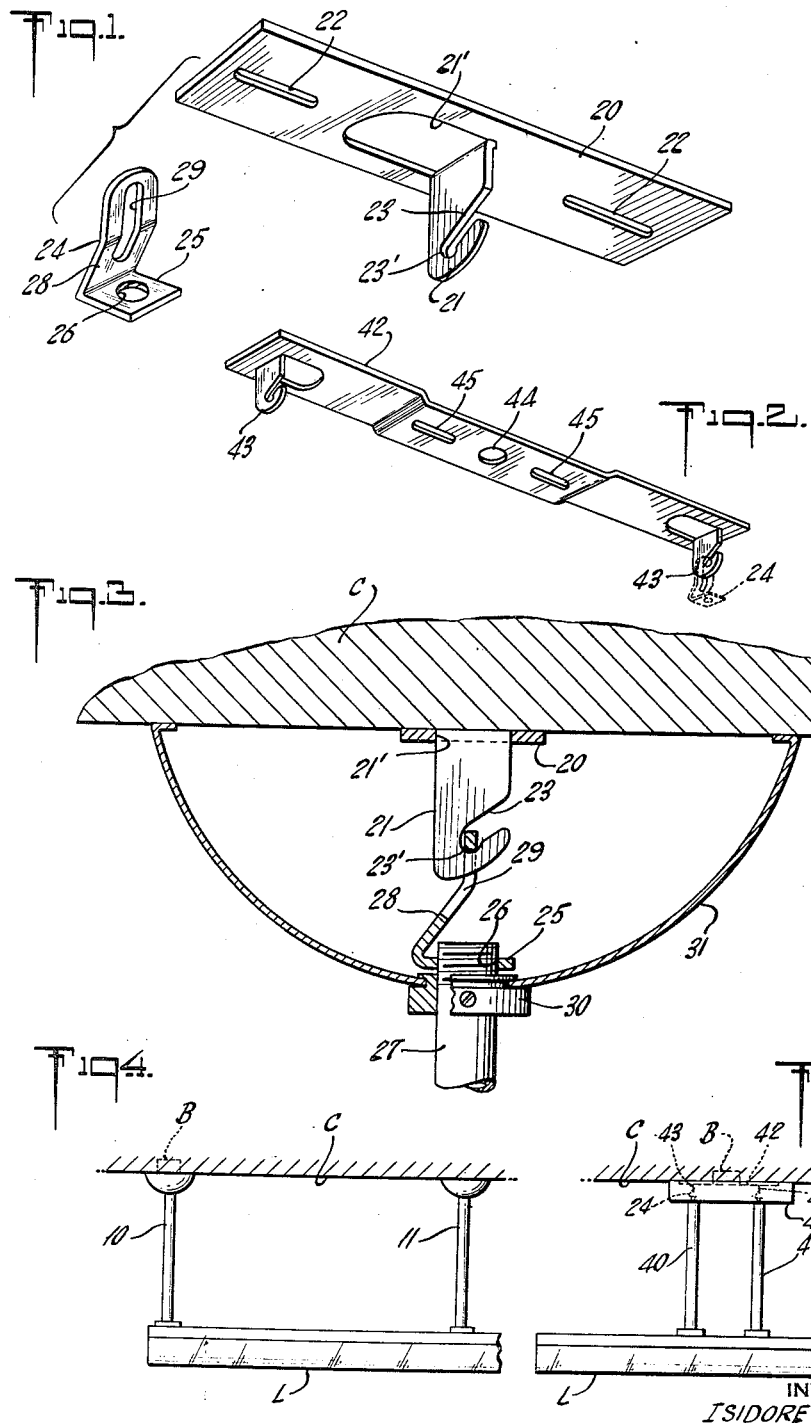
INVENTOR
*ISIDORE WOLAR*
BY
ATTORNEY

Patented Aug. 31, 1954

2,687,867

UNITED STATES PATENT OFFICE 2,687,867

HANGER FOR STEM-TYPE LIGHTING FIXTURES

Isidore Wolar, Mount Vernon, N. Y.

Application October 8, 1951, Serial No. 250,374

3 Claims. (Cl. 248—343)

The present invention relates to hangers for stem-type lighting fixtures and is more particularly directed toward hangers suitable for use for supporting the stems employed in hanging individual or continuous runs of fluorescent lighting equipment.

In the hanging of fluorescent lighting equipment it is customary to utilize a plurality of hangers one only of which carries the wires down into the fixture structure, and in case of continuous fixtures to run the wiring through the fixture structure as a conduit. The remaining hangers then are unwired and hence do not need to be supported directly from an outlet box.

The present invention relates to hangers for such purposes. According to the present invention, the usual tubular stem threaded on the upper end is secured by threading it into a fitting and this fitting is provided with an opening adapted to be received on a hook below the ceiling level.

According to the preferred forms of construction, a single hook is bent out of a strap which can be directly secured to the ceiling, where not used with an outlet box, or directly to the outlet box, or two hooks may be carried by an outlet box supported strap, one being used for the wired stem and the other for the unwired stem of an individual fluorescent type unit.

The accompanying drawings show, for purposes of illustrating the present invention, two embodiments in which the invention may take form, it being understood that the drawings are illustrative of the invention rather than limiting the same.

In the accompanying drawings:

Figure 1 is a perspective view of a strap adapted to be carried by the ceiling, or by an outlet box, and the fitting adapted to interconnect the strap and the fixture stem;

Figure 2 is a perspective view at a smaller scale, showing a strap for supporting both stems of an individually hung fluorescent fixture;

Figure 3 is a vertical cross-sectional view through an assembled hanger; and

Figures 4 and 5 are diagrammatic views illustrating the supporting of continuous fluorescent lighting equipment and individual fixtures, respectively.

In Figure 4 a continuous run of fluorescent lighting equipment is indicated at L supported below a ceiling C by stem hangers. One of the stem hangers, for example, the one at the left indicated at 10, is of any suitable construction adapted to be supported below an outlet box B, grounds the fixture and carries the wiring for the fixture. The other stems 11 may be unwired dummies to look like the wired stems, but inasmuch as no outlet box is required above them, it is possible to avoid the expense of the outlet box and the usual fittings between the stud of the outlet box and the fixture stem.

Where the present invention is intended for the support of a single stem, a comparatively heavy, sheet metal strap 20, approximately 4½ inches long and 1¼ inches wide is provided with a centrally disposed downwardly bent hook 21 leaving a hole 21' and suitable slots 22, 22 to receive toggle bolts, screws or other fastening devices by which the strap may be secured directly to the ceiling. The hook is formed to have an oblique upwardly opening slot 23 which is slightly deeper at the bottom as indicated at 23'. The fitting 24 resembles an inverted numeral "7." It has a normally horizontal portion 25 internally threaded as indicated at 26 to fit the stem 27 of the fixture. It extends obliquely upward as indicated at 28 and is provided with an opening 29 of a size such that the upper end of the fitting can be passed onto the hook 21. The fitting is so dimensioned that the axis of the threaded hole coincides with the center of the opening 29 so that the stem hangs vertically downward. The stem 27 carries a slip ring 30 which supports canopy 31 and holds it against the ceiling.

In use, the straps 20 may be secured to the ceiling at the proper spacing for supporting the stems and each stem with canopy hung from the hook in an obvious manner. The over-all depth of the hook and fitting may readily be made such as to accommodate the usual canopy and inasmuch as these parts may always be of the same size, there is no need for vertical adjustment. The hook and fitting act as a swivel so that the canopy may readily be held snugly against the ceiling by the slip ring 30. The fitting is then held in the bottom of the hook so that accidental disengagement of the parts is prevented.

If desired, the strap 20 may be secured directly to the stud extension of an outlet box which can pass through the hole 21', or it may be secured to the ears of the outlet box, similarly to the securement of an outlet box cover.

The fitting 24 may be used with any form of hook directly supported from the outlet box stud.

The form of strap illustrated in Figures 2 and 5 is intended for mounting individual fluorescent units which usually have two stems 40, 41, typically seven or ten inches apart. The strap 42 has two downwardly bent hooks 43 like hooks 21, a central hole 44 for the outlet box stud and two slots 45 for fastening to outlet box ears or for directly fastening the strap to the ceiling. Both fixture stems pass through and support the canopy 46.

Since it is obvious that the invention may be embodied in other forms and constructions within the scope of the claims, I wish it to be understood that the particular forms shown are but two of these forms, and various modifications and changes being possible, I do not otherwise limit myself in any way with respect thereto.

What is claimed is:

1. A hanger for lighting fixture stems comprising a generally flat plate adapted to be secured to the ceiling and having an integral hook struck out of said plate and extending downwardly, and a stem support in the form of a bent sheet metal strap and having an upper obliquely disposed portion apertured to receive the hook and a lower horizontal portion having a threaded hole to receive a threaded fixture stem, the upper end of the hook receiving aperture being in line with the axis of the threaded hole.

2. Means for supporting a fluorescent lighting fixture having two spaced stems, comprising a strap having a central opening for securement to an outlet box stud and two integral downwardly bent hooks spaced apart the distance between the stems, and two stem supports each in the form of a bent sheet metal strap having an obliquely disposed portion apertured to receive a hook and a lower horizontal portion having a threaded hole to receive one of the fixture stems, and having the upper end of the hook receiving aperture in line with the axis of the stem so that the two stems hang pendent and one stem is available for fixture wiring.

3. A lighting fixture support in the form of a rigid sheet metal strap provided with a hole near one end adapted to receive a fixture support and a narrow elongated longitudinally extending slot near the other end, the strap being bent about parallel folding lines into the configuration of an inverted figure "7" with the lower portion horizontal and including the end having the hole, with the extreme upper end vertical and above the axis of the hole, and with the intermediate portion oblique, the slot length being such as to locate the slot partly in the oblique portion and partly in the vertical portion, the slot being adapted to receive a hook extending in a plane at right angles to the plane of the top of the support, the edge of the hole being adapted to receive and suspend a pendant fixture support vertically below the upper end of the slot.

References Cited in the file of this patent

UNITED STATES PATENTS

| Number | Name | Date |
| --- | --- | --- |
| D. 150,820 | Anderson | Sept. 7, 1948 |
| 913,977 | Pitel | Mar. 2, 1909 |
| 1,041,458 | Goodwin | Oct. 15, 1912 |
| 1,716,017 | White | June 5, 1929 |
| 2,288,706 | Herr | July 7, 1942 |
| 2,321,640 | Adkins | June 15, 1943 |
| 2,448,001 | Maurette | Aug. 24, 1948 |
| 2,507,308 | Kruger | May 9, 1950 |
| 2,516,661 | Versen | July 25, 1950 |
| 2,525,582 | Bissell | Oct. 10, 1950 |
| 2,545,564 | Appleton | Mar. 20, 1951 |